INVENTOR.
ARTHUR E. UHLEEN.
BY
Van Deventer, Grier, + Shively
ATTORNEYS.

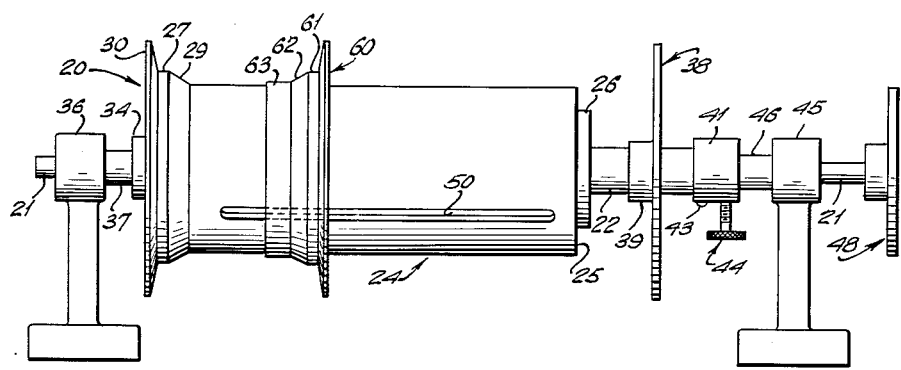
Fig. 4.
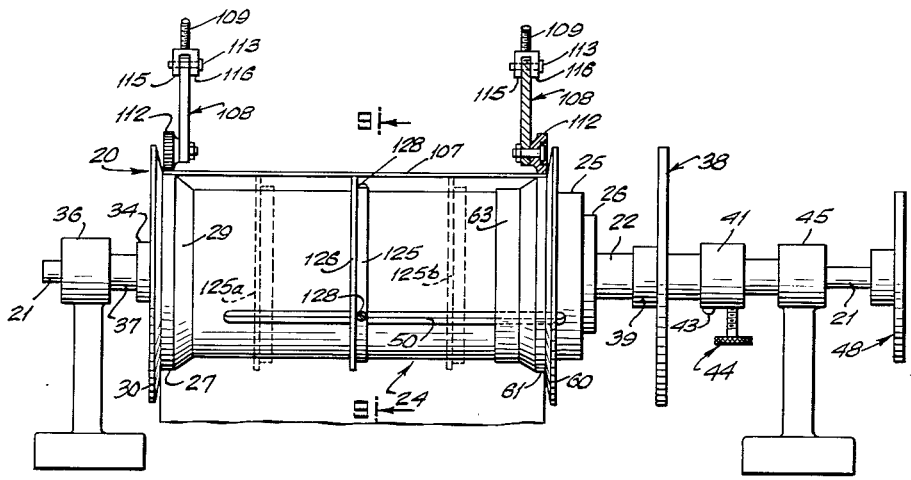
Fig. 8.
Fig. 9.
INVENTOR.
ARTHUR E. UHLEEN.
BY
Van Deventer, Griss, & Shively
ATTORNEYS.

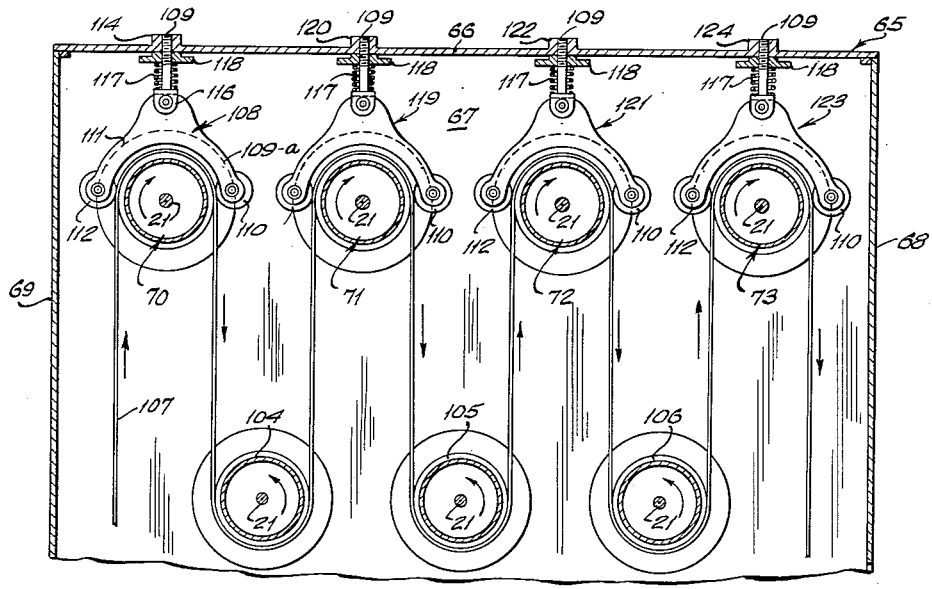
Fig. 5.
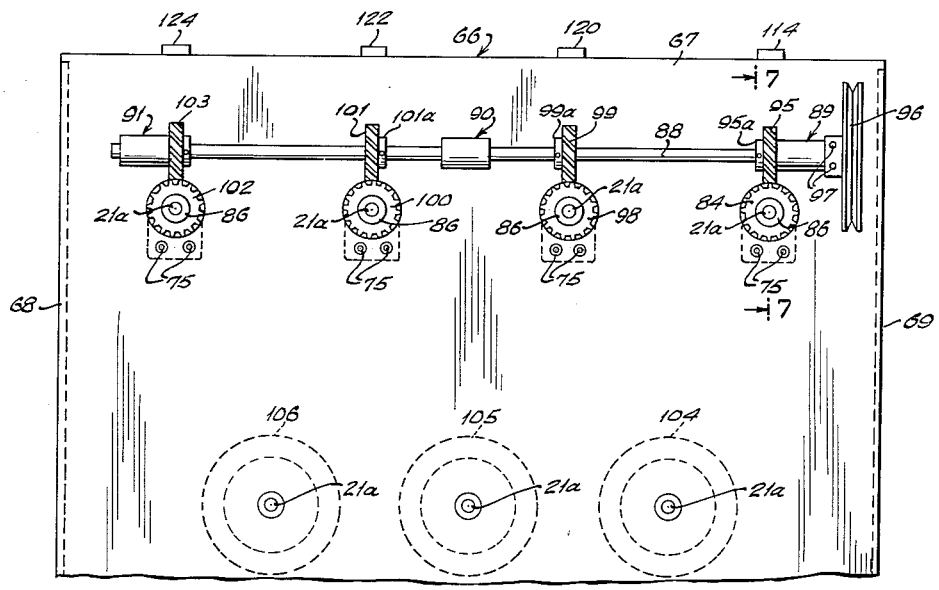
Fig. 6.
Fig. 7.
INVENTOR.
ARTHUR E. UHLEEN
BY
ATTORNEYS.

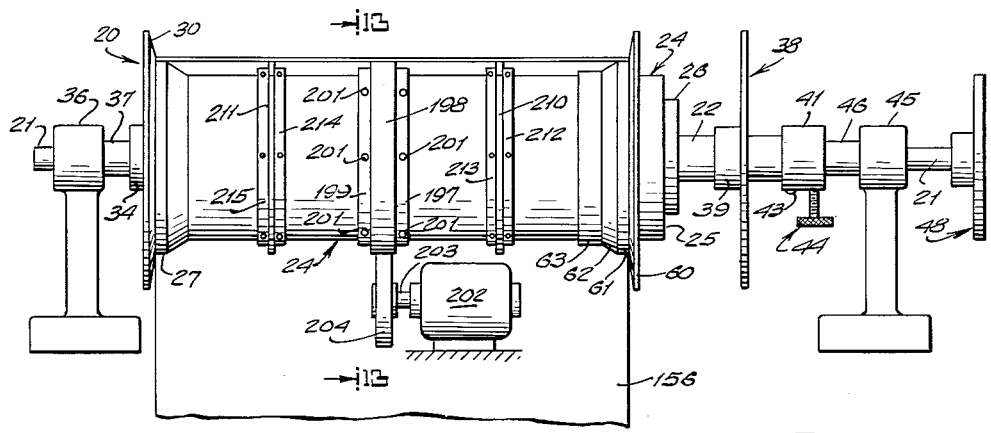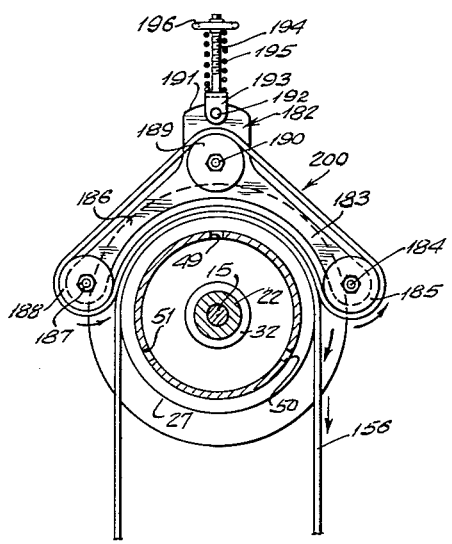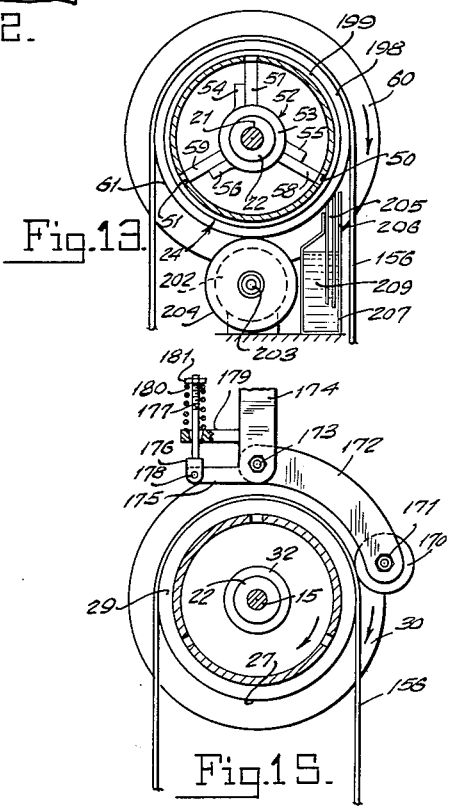

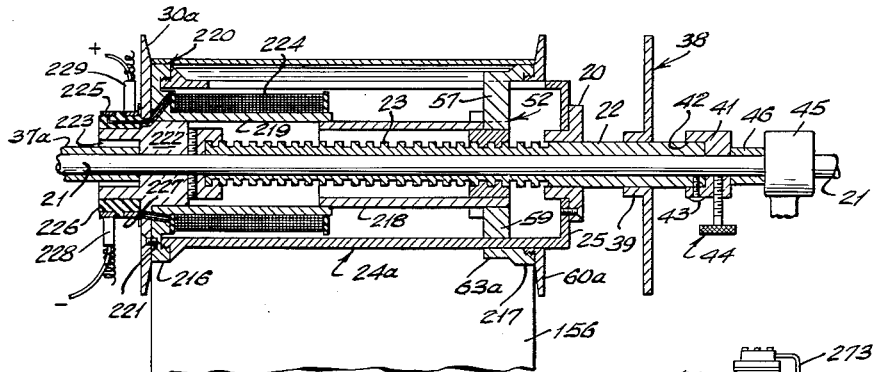
Fig. 16.
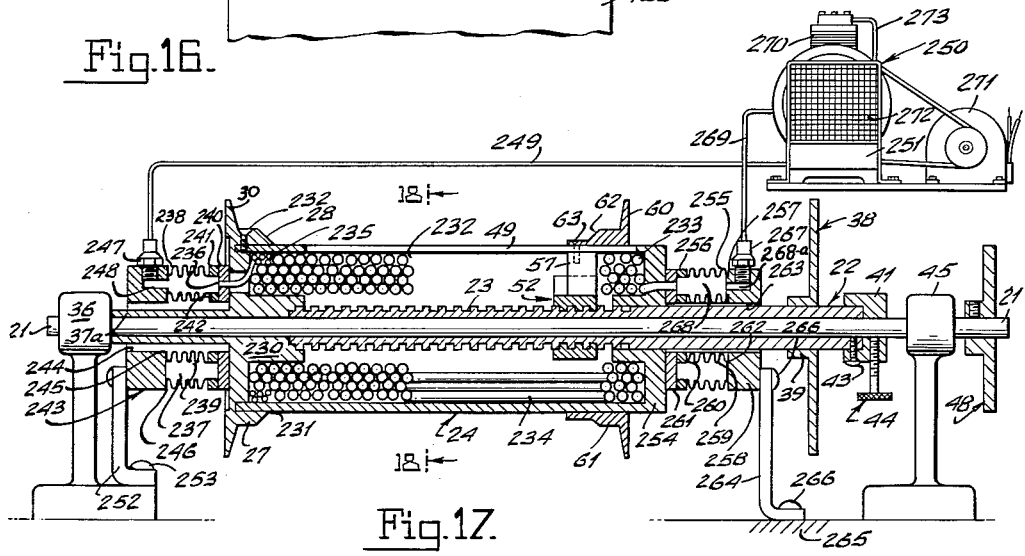
Fig. 17.
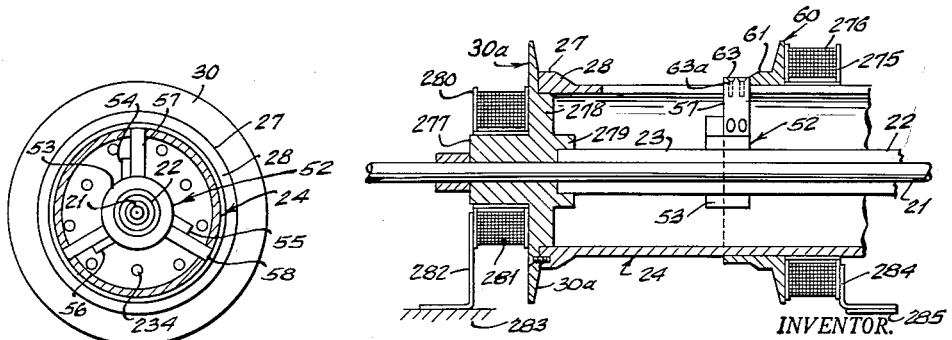
Fig. 18.
Fig. 19
INVENTOR.
ARTHUR E. UHLEEN.
BY
ATTORNEYS.

April 18, 1961      A. E. UHLEEN      2,979,829

ROLLER AND APPARATUS FOR TRANSPORTING STRIP MATERIAL

Original Filed Feb. 25, 1953      7 Sheets-Sheet 7

INVENTOR.
ARTHUR E. UHLEEN
BY
ATTORNEYS.

United States Patent Office 2,979,829
Patented Apr. 18, 1961

2,979,829

ROLLER AND APPARATUS FOR TRANSPORTING STRIP MATERIAL

Arthur E. Uhleen, Allentown, Pa., assignor to National Steel Corporation, a corporation of Delaware Continuation of application Ser. No. 338,798, Feb. 25, 1953. This application July 15, 1958, Ser. No. 752,154

10 Claims. (Cl. 34—90)

This invention relates to improvements in rollers and apparatus for transporting sheet material and, in one of its more specific embodiments, to apparatus for transporting coated flexible sheet material through a confined space wherein said sheet is festooned over a series of rollers each having comparatively narrow annular ledges adjacent to each end contacted by corresponding narrow areas adjacent to the edges of said sheet.

One of the objects of the invention is the provision of an improved form of roller which may be rapidly adjusted to accommodate various widths of sheet material, and then locked to retain such adjustment.

Another object of the invention is the provision, in apparatus of the character described, of means for maintaining the flexible strip in intimate contact with the ledges of the roller.

A further object of the invention is the provision of an enclosure having a plurality of arrays of said rollers disposed in spaced relation to each other, the flexible strip being festooned over said rollers, some of said rollers being positively driven and some of them being free.

Yet another object of the invention is the provision, in apparatus of the character described, of a roller having at least the annular ledges thereon refrigerated, thereby in effect causing a coated flexible strip passing thereover to act as if the coating were drier than it actually is:

Another object of the invention is the provision, in apparatus of the character described, of means employing a solvent for cleaning surfaces of said rollers contacted by said coated flexible strip material.

Another object of the invention is the provision, in apparatus of the character described, of other annula on said roller, preferably at nodal points, adapted to contact the flexible strip material at one or more points between said annular ledges. In some instances the annulus or the annula are fixedly mounted on the roller, and in other instances, the annulus or the annula are rotatable on defined paths on the roller and may be driven at speeds higher than that of the roller upon which said annulus is carried for providing an uncoated area extending longitudinally of the strip between the edges thereof.

Other objects and advantages of the invention will become apparent to those skilled in the art upon a study of this specification and the accompanying drawings.

Referring to the drawings which are given by way of example:

Figure 4 is a side elevation similar to Figure 2, except that the roller has been set for narrower strip material;

Figure 5 is an elevation, partly in section, of a confined space having upper and lower arrays of rollers over which the strip material is festooned, and cooperating rollers for holding the strip in contact with the ledges of said rollers;

Figure 6 is an elevation of the arrangement shown in Figure 5 as seen from the opposite side thereof and showing the upper array positively driven and the rollers in the lower array as "free;"

Figure 7 is a cross-sectional elevation taken along the line 7—7 of Figure 6;

Figure 8 is an elevation of a modification of the roller shown in Figure 2, wherein an annulus is mounted thereon intermediate the ends of said roller, and others are shown in dotted lines at points between the first annulus and one end or the other end of the roller;

Figure 9 is a cross-sectional view, taken along the line 9—9 of Fig. 8 showing one method of securing the annulus fixedly on the roller;

Figure 12 is a view of an arrangement wherein an annulus is rotatably carried on a roller in contact with a flexible metallic enameled strip passing over said roller and is driven by an independent prime mover;

Figure 13 is a sectional elevation taken along the line 13—13 of Figure 12, showing the frictional drive for the annulus, independent of the roller drive;

Figure 14 shows a modified form of means for holding the metallic strip in contact with the roller;

Figure 15 shows a modification wherein a single contact roller is employed for engaging the flexible metallic strip and holding it in contact with the roller;

Figure 16 is a cross-sectional elevation of a modified roller which employs an electro-magnetic winding for oppositely magnetizing the spaced apart ledges of the roller so that the flexible metallic strip is held in intimate contact with said ledges;

Figure 17 is a cross-sectional elevation of another modified roller which carries means to refrigerate the two ledges so that the portions of coated strip in contact therewith are in effect prevented from sticking to said ledges as the festooned strip carried by the rollers in arrays such as shown herein are not damaged;

Figure 18 is a section taken along the line 18—18 of Fig. 17 showing some of the convolutions of the evaporator;

Figure 19 is a sectional elevation showing the use of induction heating of the ledges to speed up the drying of coatings on metallic strips in the areas contacting said ledges;

Figure 1:
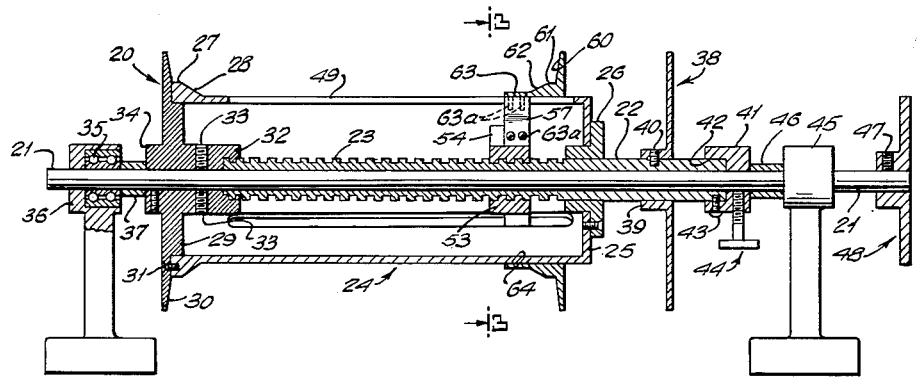
Figure 1 is a cross-sectional elevation of my new and improved adjustable roller.

There are shown herein three types of chambers having arrays of positively driven rollers, and having arrays of free rollers spaced apart therefrom and having the flexible strip festooned over these rollers.

With the arrangements shown and described, two important advantages obtain:

(1) The flexible strip, as it is festooned over the rollers forms at least one half of a cylinder, thereby providing a substantially rigid embrasure of the roller, via the ledges on the rollers, and facilitating the maintaining of a driving relation between said strip and the "driven" rollers even when the strip is extremely thin; and (2) By positively driving a series of rollers in an array, I drive small sections of the festoon, thereby breaking the entire drive into a series of increments wherein the load or pull on any section of the festoon is minimized to the point that no undue strains can be imposed on the strip as a whole or any portion thereof.

The above being the case I can move my strip at high speed without deleterious effects and consequently I obtain a quality product. The arrangements herein shown and described, in addition to the effects above described, have many other advantages which will be readily apparent to those skilled in the art, as this specification unfolds.

Although the description of the figures referred to "flexible metallic strips," it will be understood that the strips do not necessarily have to be "metallic," as flexible strips which are non-metallic have also been and are now being handled by my apparatus.

Referring first to Figures 1, 2, 3 and 4, my new and improved roller 20 includes a supporting shaft 21 upon which is mounted a sleeve member 22 forming a working fit on said shaft and which has threads 23 formed thereon. A tubular body 24 has a closed end 25 into which a shouldered bushing 26 is mounted. This bushing forms a working fit on the sleeve member 22. The other end of the body 24 is open, and bordering this end is formed an annular ledge 27 and a bevel 28 is formed between said ledge and the tubular outer surface of the body 24.

A disc-like flange 30 has formed integral therewith a boss 29 which fits into the open end of the body 24. The flange is secured to said open end by means of screws, one of which is shown at 31, or by any other suitable means. Formed integral with the boss 29, is a second boss or hub 32, which fits the shaft 21, and which is counterbored to accommodate the left end of the sleeve member 22. The hub 32 is fixed on the shaft 21 by means of set screws 33. The flange member 30 has a boss 34 which extends from the left end of the roller 20 as seen in Figure 1.

The shaft 21 may be mounted, for example in ball bearings such as the one shown at 35 mounted in a bearing standard 36, and a spacer sleeve 37 may be positioned on the shaft between the boss 34 and the bearing 35.

A flange member 38 has a hub 39 which is secured on the sleeve member 22 by means of a set screw 40. Thus by means of the flange member 38, the sleeve member 22 may be rotated in either direction for a purpose to be described hereinafter. A boss 41 has a central hole therein which forms a working fit on the shaft 21, and a counterbored hole 42 formed therein fits the end of the sleeve member 22, and the boss 41 is secured to the sleeve member by means of screws, one of which is shown at 43. A thumb screw 44 engages a threaded hole formed in the boss 41 and when screwed in it locks the sleeve 22, the boss 41 and the shaft 21 together so that they move in unison.

The bearing standard 45 also carries a ball bearing like that shown at 35, and a sleeve 46 between the boss 41 and the bearing standard 45 eliminates lost motion between the elements on the shaft 21 and the bearings. It will be understood that the shaft 21 may be driven by practically any desired means, and in Figure 1, one example of a driving means could be a coupling, one half of which is shown at 48, and secured on the shaft 21 by means of a set screw 47.

The tubular body has, in the embodiment shown, three elongated slots 49, 50, and 51 formed therein parallel to the axis on said roller. A spider 52 has a hub 53 which is internally threaded to fit the threads 23 formed on the sleeve member 22. The spider has legs 54, 55, and 56 to which extensions 57, 58 and 59 respectively are secured. The extensions extend through the slots 49, 50 and 51 respectively, a few thousandths of an inch to provide sufficient clearance for a movable member which will now be described.

A flange member 60 has formed integral therewith a boss portion forming an annular ledge 61 and a beveled portion 62. Formed integral with the flange member 60 is a tubular portion 63. The unitary structure 60, 61, 62, 63 has an interior bore 64 which is just a few thousandths (for example 1.5 to 2 thousandths of an inch) larger than the outer diameter of the tubular body 24 and the same is the case with the extensions 57, 58 and 59, so the sleeve portion 63 closely embraces and is secured to said extensions by means of screws 63a.

Figure 2:
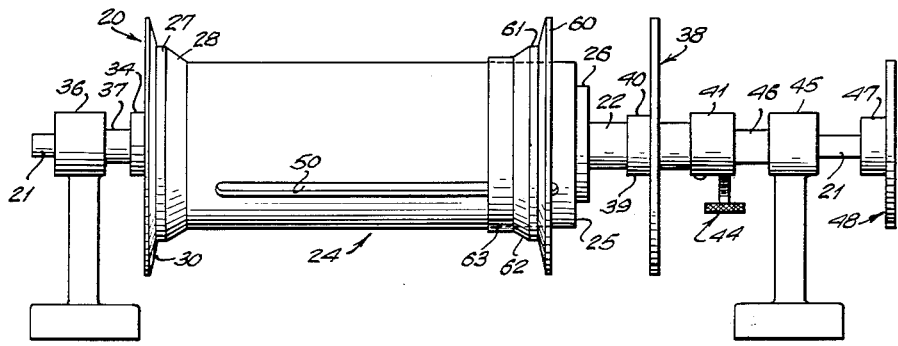
Figure 2 is a side elevation of the improved roller of Figure 1.
Figure 3:
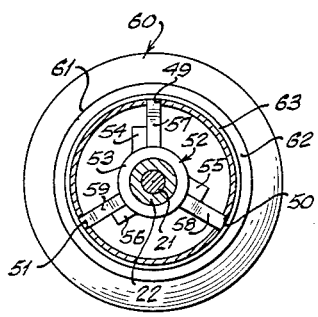
Figure 3 is a cross-section of the roller as seen along the line 3—3 of Figure 1.

It will be noted that in Figures 1 and 2, the flanges 30 and 60 are spaced apart a substantial distance, and if moved further apart, they would reach the maximum limit. Now if the thumb screw 44 is loosened, the wheel 38 may be turned in one direction to move the flange 60 toward the end 25; or the wheel 38 may be turned in the opposite direction to move the flange 60 toward the flange 30, due to the fact that the threaded sleeve rotating in the threaded spider 52 causes the spider to move toward the left as seen in Figure 1, so that the flange elements 60, 61, 62 and 63, through the medium of the extensions move to the left as long as the wheel 38 is turned in said last direction, the flange moves toward the flange 30 until the relation shown in Figure 4 is reached. In this relation the spacing of the flanges is for the narrowest flexible strip material. When the roller has been set for a wanted width the setting is retained by tightening the thumb screw 44.

Referring now to Figures 5, 6, and 7, I show a series of rollers, of the type described above, within an enclosure or chamber generally designated by the numeral 65. The chamber 65 may have a top wall 66 secured to or maintained in fixed relation with a front wall 67 and with a rear wall (not shown). The chamber may also have right and left end walls 68 and 69 respectively, which may be in fixed relation to the front and rear walls, or they may be hinged or otherwise movably or removably carried thereon so that access to the interior may be had for purposes to be presently described.

A series of rollers 70, 71, 72, 73 which are like the roller 20 described above, are positively driven as will now be described. The bearing standards 36 and 45 are modified as shown at 45a in Figure 7 by providing a laterally facing base 74 and securing it to the upper portion 67 of the front wall, by means of cap screws 75 passing through said upper portion and engaging threaded holes formed in a reinforcing bar 76. Each shaft 21 is made longer to accommodate a friction clutch 77 and the longer end portion, in Figure 7, is designated as 21a. This portion 21a has a flanged bushing 78 secured thereto, for example, by means of a pin 79 passing through the flange and the shaft. The shank portion is provided with external threads 80. A disc-like member 81 has internal threads which engage the threads 80 and the latter are also engaged by a locknut 82 which abuts the disc member 81. A disc 83 is keyed to the shaft 21a for example, by a woodruff key. Spaced apart from the disc 83 is a spiral gear 84. Between the disc 83 and the spiral gear 84 is a disc 85, which may carry on the opposite faces thereof suitable friction clutch material to cooperate with the face of the disc 83 and with the face of the gear 84 and transmit power from said gear to the shaft 21a via the disc 83. The disc 83 can move freely lengthwise on the key, and a spring 87 is positioned between the disc member 81 and the disc 83, and the disc member 81 may be screwed along the bushing to increase or decrease the frictional engagement of the disc 83 with the friction disc 85, and the engagement of the latter with the face of the spiral gear 84.

A shaft 88 is journaled in a series of bearing standards 89, 90, and 91 secured on the wall portion 67. Since these standards are substantially identical, the following description of the standard 89 should be sufficient for all three. The standard 89 has a base 92 which may be secured to the wall portion 67 in any suitable manner, as by screws (not shown). Joining the base is a stem portion 93, which supports on its outer end a bearing boss 94 which may carry any desired type of bearing, sleeve, ball, or roller.

The shaft 88 has secured thereon for example by a headless set screw, a spiral gear 95, which meshes with the spiral gear 84 and has a hub 95a. A grooved pulley 96 is secured on the shaft 88 by means of set screws 97, and it may be driven by means of a prime mover and a V belt, or the shaft 88 may be driven by any other means desired.

The roller 71 carries on the outer end 21a of its shaft, a spiral gear 98 which meshes with a spiral gear 99 secured on the shaft 88. Between the spiral gear 98 and the shaft of the roller 71 is a friction clutch which is identical with that shown in Figure 7.

The roller 72 carries on the outer end 21a of its shaft, a spiral gear 100 which meshes with a spiral gear 101 secured on the shaft 88. Between the gear 100 and the shaft of the roller 72 is a friction clutch like the one shown in Figure 7.

The roller 73 carries on the outer end 21a of its shaft, a spiral gear 102 which meshes with a spiral gear 103 secured on the shaft 88. Between the gear 102 and the shaft of the roller 73 is a friction clutch like that shown in Figure 7. As the shaft 88 is rotated, the rollers 70, 71, 72 and 73 rotate in unison and at the same speed.

Figures 10, 11:
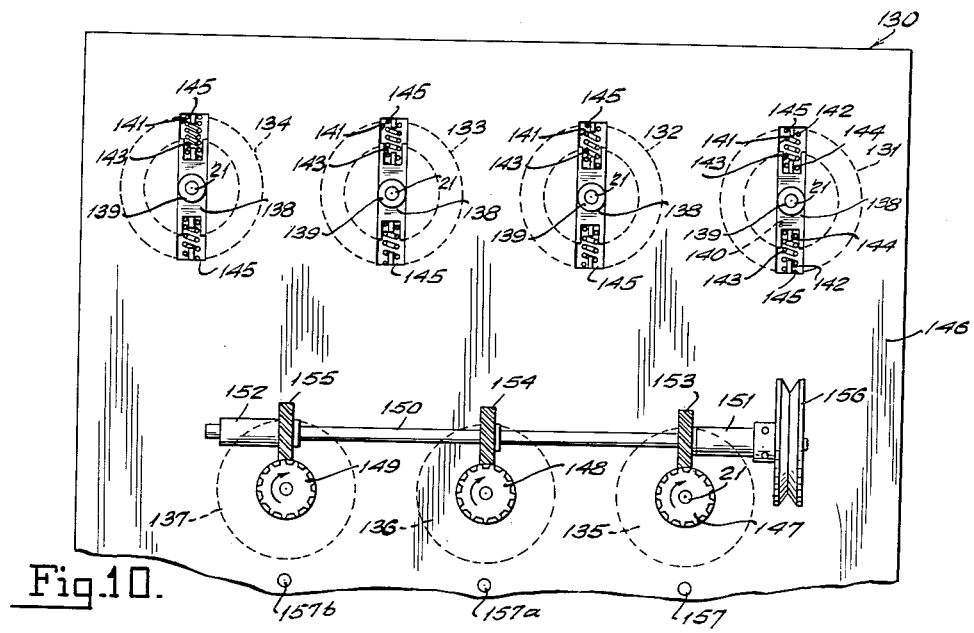
Figure 10 is a view of a confined space having upper and lower arrays of rollers, the lower array being positively driven, and the upper array being free rollers arranged to compensate for any irregularities in the movement of a flexible metallic strip festooned over said rollers.
Figure 11 is a view of the arrangement shown in Figure 10 as seen from the opposite side, and showing roller means engaging the metallic strip for maintaining the strip in substantially non-slipping relation with the flanged roller which said strip passes over.

Spaced apart from the above mentioned rollers is an array of free rollers 104, 105 and 106. These free rollers are substantially identical with the one described above in connection with Figures 1 and 2, and they may be fixed with respect to distances from the fixed or driven rollers as shown in Figures 1 and 2, or they may be resiliently supported as shown in Figure 10 so as to compensate for any variations. Figure 10 will be presently described.

The rollers shown in Figures 5 and 6 have a strip 107 festooned thereover as may best be seen in Figure 5, and the direction of movement of the strip and the rotation of said rollers are indicated by means of arrows.

For holding the strip 107 in contact with the ledges, one arrangement is shown in Figure 5, wherein a yoke member 108 has an arm 109-a carrying a shouldered bolt upon which a roller 110 is journaled. This roller bears on the edge of the strip 107 slightly above a horizontal plane cutting the axis of said roller. The yoke 108 also has another arm 111 which carries a shouldered bolt upon which a roller 112 is journaled. The yoke member 108 has its upper portion (Figure 8) journaled on a clevis pin 113 which extends through aligned holes in the adjacent spaced bosses 115, 116 which are formed integral with a threaded shank 109. The top wall has a boss 114 formed integral therewith, and it has a central hole therein which is in vertical alignment with the ledge 27 so that when the shank 109 is in said hole, the rollers 110 and 112 may, when pressure is exerted, urge the strip 107 into driven relation with the ledge 27. For exerting said pressure in a controllable manner, I place a spring 117 on the threaded shank 109 and by means of a hand wheel 118 which threadedly engages the threads on the shank 109, the pressure may be adjusted to any desired value.

The ledge 27 on the roller 71 is engaged by similar rollers carried on the arms of a yoke member 119 which is substantially like the yoke 108 and it carries like rollers, and a like spring and a like hand wheel threadedly engaging a threaded shank 109 which extends into a boss 120, spaced apart from the boss 114 on the top wall 66.

The ledges 27 on the rollers 72 and 73 are likewise engaged by rollers 110 and 112 with the strip 107 therebetween, said rollers comprising sets, one of which is carried on a yoke 121 and the other set being carried on a yoke 123. The shank 109 supporting yoke 121 extends into a hole in boss 122 in the top wall 66, and the shank supporting yoke 123 extends into a boss 124 on said top plate 66.

Now, for holding the opposite edge of the strip 107 into contact with the ledge 61, opposite to the ledge 27, I employ yokes, rollers, etc., substantially like those described above; thus the strip 107 has its opposite edges held into contact with the ledges 27 and 61 respectively, so that the driving of the rollers 70, 71, 72, and 73, uniformly advances the strip 107 which is festooned over these rollers and the free rollers 104, 105 and 106 in the manner described.

Various types of strip material may be passed over the roller assemblies of the kind described herein as, for instance, strips of steel, aluminum, brass, vulcanized fiber, heavy paper or plastic. The strip material used must be sufficiently flexible to undergo flexing when passed over the rollers without putting objectionably heavy stress upon those rollers. On the other hand, the strip must be sufficiently stiff so as not to sag when flexed. Thus, the strip should extend as a practically straight arch between the faces of the supporting rollers. Also, the strip should be sufficiently strong so that the edge of it can support the entire strip in passing over the roller assembly. While a great variation in the stiffness and calibre of the strip material is permissible, a typical example of a strip that works well is strip steel of thickness of from 2½ to approximately 62 thousandths of an inch.

Referring again to Figure 8 and also to Figure 9, an annular ring 125 has an interior bore 127, which forms a working fit on the body 24. This ring also has a radial flange 126 which is preferably not less than the diameters of the ledges 27 and 61. The ring 125 may be positioned on the body in any desired position relative to the flanges 30 and 60. In Figure 8, I show it with its flange 126 equidistant from the ledges 61 and 27, and it may be fixedly secured in any set position by means of screws 128 extending through holes spaced 120° apart in the ring 125 and extending through the slots 49, 50 and 51 formed in the body 24 and engaging threaded holes formed in the lugs 129 in said body. By tightening the screws 128, the ring 125 may be readily locked against longitudinal movement on said body. Other ring members may be used and positioned as desired on the surface of the body 24, as indicated in dotted lines at 125a and 125b. The ring member 125 shown with its flange 126 midway between the ledges 27 and 61, contacts the strip 107 along a median line and lends support on said median line, in addition to the support by the ledges 27 and 61.

In the modification shown in Figures 10 and 11, the enclosure or chamber 130 has a series of free rollers 131, 132, 133 and 134 arrayed therein, and spaced apart from this series is a second series 135, 136 and 137.

In the first series the rollers 131, 132, 133 and 134 are substantially like the roller described in connection with Figures 1 and 2, except for the shape of the bearing standards. Here, referring to the free roller 131, the bearing standard is comprised of a metallic block member 138 having opposed grooves which slidably engage opposed tongue portions 140 formed on the opposite borders of a slot 141 formed in the wall 146 of chamber 130. The block 138 may carry a bearing bushing 139, or any other type of bearing. Opposite ends of the slot 141 are provided with axially extending studs 142. The block member 138 has a cross-slot 143 formed in each end thereof, and each cross-slot has a stud 144 therein disposed on the axis of said member 138 and each extending toward the adjacent stud in the end of the slot 141. Positioned in each cross-slot is a helical spring 145 which is retained therein by the adjacent studs 142 and 144. The tension of these springs is such that the block members 138 float and may give out or take up as the load on the roller varies. Thus the block member 138 is resiliently held midway the slot 141 so long as no undue strain is placed upon the metallic strip festooned over the two series of rollers, as will presently be described. It will be understood that the shaft 21 of the roller has each end journaled in a member 138—one in the front wall 146 and one in the opposite wall (not shown).

The free rollers 132, 133 and 134 have their shafts 21 journaled in like block members 138 on both ends thereof so that the whole array of free rollers 131, 132, 133, and 134 float. Since the other block members are identical with the one already described a detailed description of them is deemed unnecessary.

The rollers 135, 136, and 137 have their shafts mounted like those shown at 70, 71, 72, and 73 shown in Figure 5, and detailed in Figure 7. They also carry individual friction clutches 77 between a member 83 slidable on the shaft and spring pressed against a faced disc 85 which in turn is pressed into frictional engagement with spiral gear 84. The spiral gear 147 is identical with the gear 84, and the clutch between said gear and the roller shaft is identical with that shown at 77 in Figure 7. The spiral gears 148 and 149 on the shafts of the rollers 148 and 149 are respectively identical with the gear 84 and they are likewise provided with clutches like the clutch 77.

A shaft 150 is journaled in bearings 151 and 152 carried on bearing standards secured to the wall 146. Keyed to the shaft 150 is a spiral gear 153 which meshes with the spiral gear 147. Keyed to the shaft 150 is a spiral gear 154 which meshes with the spiral gear 148, and a spiral gear 156 on the shaft 150 meshes with the gear 149, so that when a grooved pulley 156 secured on the shaft 150 is driven by a prime mover, the rollers 135, 136 and 137 are positively driven and at a common rate of speed.

A flexible metallic strip 156 is festooned over the rollers and moves thereover in the direction of the arrows. For maintaining the strip in contact with the driven rollers 135, 136 and 137, the following arrangement is employed: A stud 157, mounted in the wall 146, extends inwardly. Pivotally mounted on the stud 157 are members 158 and 159 which respectively carry spring posts 160 and 161 which are engaged by a spring 162 for urging said arms toward each other. The arm 158 carries a shouldered screw 163 upon which a roller 164 is journaled. This roller holds the edge of the strip 156 into firm contact with the annular ledge 27 on the roller. The arm 159 carries a shouldered screw 165 upon which a roller 166 is journaled and this roller also urges the edge of the strip 156 into contact with the ledge 27, due to the urge of the spring 162. The arms 158 and 159 are shaped to provide clearance for the annular ledge 27 with the strip thereover. The ledge 60 of this roller is also engaged by identical lever carried rollers (not shown) carrying rollers, with the strip 156 therebetween. The roller 136 has an identical structure for maintaining the strip in contact therewith, and this likewise is the case with roller 137, so the corresponding elements cooperating with roller 136 are given the same numeral followed by the letter *a*, and those cooperating with roller 137 are given the same numeral followed by the letter *b*. Since the springs 162, 162*a* and 162*b* are substantially identical, the urge of the rollers carried by the sets of arms 158 and 159 is substantially equal and the strip is advanced over the arrays uniformly, especially since the lever-roller arrays are not only holding the strip into contact with the ledges 27 of the rollers 136 and 137 as shown, but other lever-roller arrays with their identical spring urges cooperate with the strip where it passes over the ledges 61 of the rollers 136 and 137.

The chamber 130 has a top wall 167 and end walls 168 and 169 joining both the wall 146 and the wall (not shown) opposite the wall 146. As stated above in connection with the chamber in Figures 5 and 6 some of the walls may be detached from the others, or some of them may be hinged to provide access to the interior of the chamber, or the walls shown may be skeletonized and a closed chamber may be formed within the space between the arrays of rollers. In this case, the walls of the chamber are provided with slots through which the flexible strip may pass, since the rollers would be outside the walls of the chamber.

Figure 20:
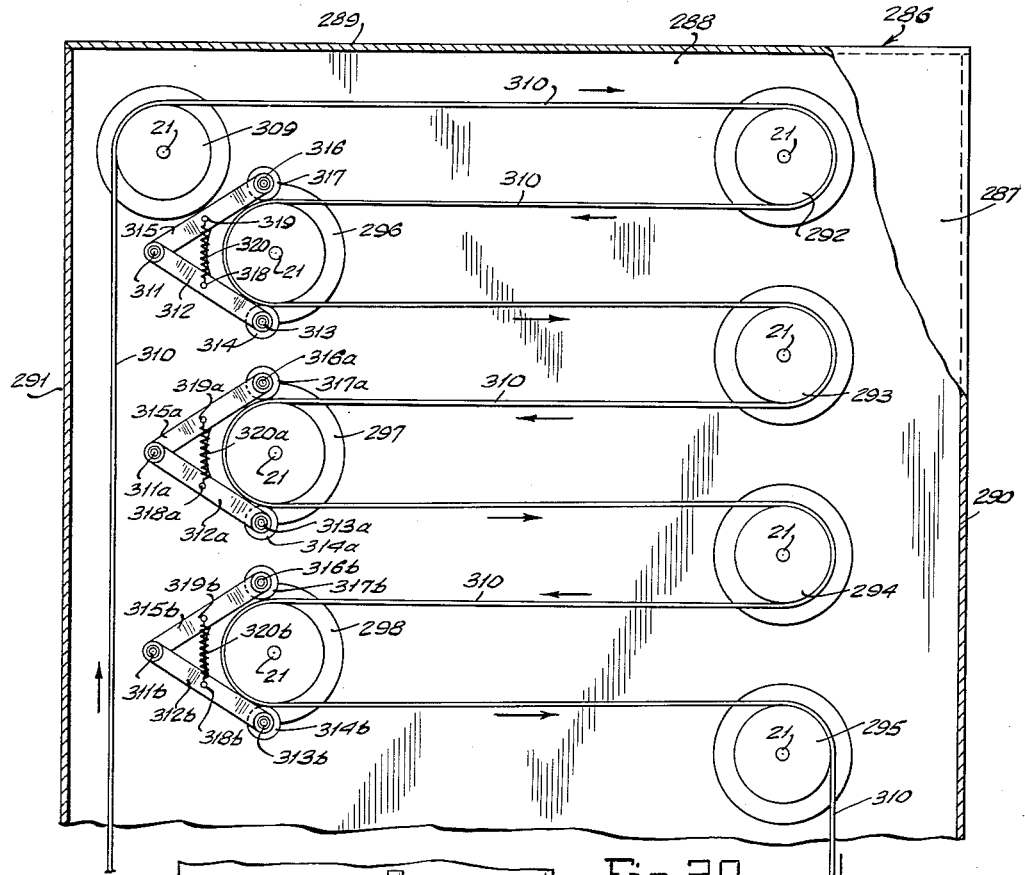
Figure 20 is a view of a confined space or chamber which has arrays of rollers spaced apart laterally, the rollers in one array being "free" rollers, and at least some of the rollers in the other array being positively driven.
Figure 21:
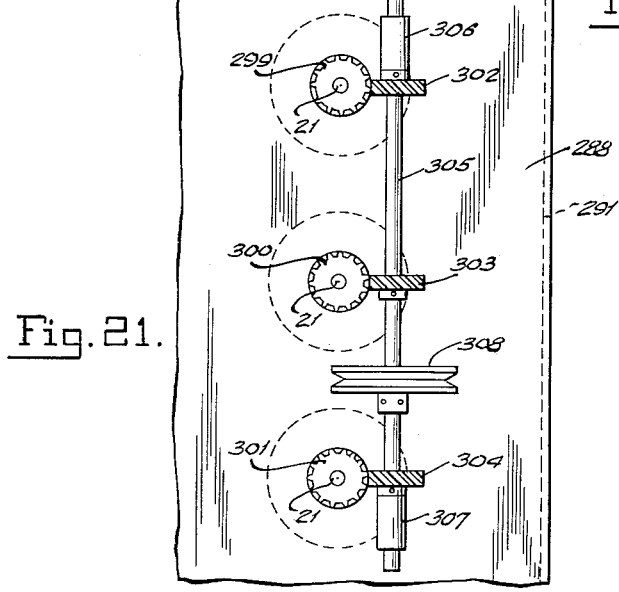
Figure 21 is a view of a portion of the chamber as seen from the opposite side of Figure 20, showing one method of positively driving the "driven" rollers.

In the modification shown in Figures 20 and 21, the enclosure or chamber 286 includes a front wall 287, a rear wall 288, a top wall 289, and end walls 290 and 291 respectively. This chamber has a series of free rollers 292, 293, 294 and 295 disposed in a vertical array therein, as contrasted with the horizontal arrays described in connection with Figures 5 and 6, and Figures 10 and 11 described hereinbefore. Although various forms of rollers may be used in such an array, I prefer to employ rollers of the type shown in Figures 1 and 2.

Spaced apart from the array of "free" rollers 292 to 295 inclusive, is a second vertical array which includes rollers 296, 297 and 298. The shafts 21 of these rollers extend through suitable bearings on the supporting walls 287 and 288 and they carry friction clutch means (like that shown in Figure 7) between their shafts 21 and the individual spiral gears 299, 300 and 301 which are substantially identical with the spiral gear 84 shown in Figure 7.

Meshing with the spiral gears 299, 300 and 301 are spiral gears 302, 303 and 304 respectively, which are fixed on a shaft 305. The shaft 305 is journaled in bearings 306 and 307, which are secured on the wall 288. A grooved pulley 308 or any other suitable means is provided for rotating the shaft 305.

A free roller 309 is supported in suitable beearings on the walls 287 and 288 and a flexible strip means 310 is festooned over said last free roller and said arrays as shown in Figure 20.

For maintaining the strip in driving relation with the driven rollers I provide an array of sets of pressure rollers resembling those shown in Figure 11. A stud 311 has one end of a lever 312 journaled thereon, and its other end carries a shouldered screw 313 upon which a pressure roller 314 is journaled. The stud 311 has one end of another lever 315 journaled thereon, and the other end of this lever carries a shouldered screw 316 upon which a pressure roller 317 is journaled. The lever 312 carries a spring post 318 and the lever 315 carries a spring post 319, and a spring 320, engaging said spring posts, urges the pressure rollers 314 and 317 against the strip 310 and the strip into more intimate contact with the roller 296.

The rollers 297 and 298 have the same sets of pressure rollers. Since a description of these would be repetitive, I have given them the same numerals described above, followed by the letter *a* (for roller 297) and followed by the letter *b* (for roller 298).

The modification shown in these figures, 20 and 21 are particularly adapted for certain types of work, and for certain other purposes any other type of roller or modification thereof shown and described herein may be employed, as well as many other types arrayed in my novel arrangement of two vertical arrays with the flexible strip means festooned thereon extending horizontally across the space within the chamber.

Referring now to Figure 15, I show a modification wherein the strip 156 is held into engagement with the ledge 27 by means of a single roller 170 disposed on the trailing side of the roller assembly (like that shown as roller 20) instead of two rollers such as 110, 112 in Figure 5 or 164, 166 in Figure 11.

The roller 170 is carried on a shoulder screw 171 which is secured in one end of the curved arm 172. The other end of the arm 172 is pivotally supported on a shouldered screw 173 which is mounted on a depending fixed member 174. The curved arm 172 has an extension 175, the end of which is straddled by the bifurcated head 176 of a bolt member 177, and a clevis pin 178 pivotally connects the head with the extension. The support 174 has an extension 179 through which the bolt 177 extends. A spring 180 embraces the bolt and rests upon the extension 179. A nut 181 with a washer under it, bears on the upper end of the spring and may be screwed down on the bolt to increase the urge of the roller 170 against the strip 156 and the ledge 27.

Yet another modification is shown in Figure 14, wherein a roller like that shown in Figure 2, has a metallic strip 156 with its edge engaging the ledge 27, and for maintaining it in engagement with said ledge, I provide a bifurcated member 182 having one arm 183 carrying a shouldered screw 184 upon which a roller or pulley 185 is journaled. The other arm 186 carries a shouldered screw 187 upon which a pulley 188 is journaled. A third pulley 189 is journaled on a shouldered screw 190 on the head portion 191.

A bolt 192 has a bifurcated head 193 with aligned holes therethrough matching a corresponding hole in the head 191 and secured in cooperative relation with said head by a clevis pin 194. A spring 195 embraces the bolt 194 and a hand wheel 196 is provided for varying the tension of the spring 195. An endless belt 200 embraces the pulleys 185, 188 and 189, and between the pulleys 185 and 188, the span of the belt is always in contact with the strip 156 and maintains it in contact with the ledge 27. The bolt 194 may extend into a hole in a boss or the like in a manner similar to the bolt 109 shown in Figure 5, and it is apparent that by means of the handwheel 196, the tension of the spring 195 may be adjusted.

In the modification shown in Figures 12 and 13, an annular ring 198 may have a lateral annulus 197 on one side thereof and a second lateral annulus 199 on the other side thereof. These annula have interior bores which form working fits on the body 24. The rings 197 and 199 are positioned on the body in abutting relation with ring 198, and a plurality of screws 201 extend through clearance holes in rings 197 and 199 and engage threaded holes in said body, thereby rotatably holding the ring 198 therebetween on the body 24. The surface of the periphery of said ring lies on a diameter which is at least no smaller than the diameters of the ledges 27 and 61, and said surface is of a nature which facilitates the driving of the ring frictionally. An electric motor 202 has mounted on its shaft 203, a friction wheel 204 which frictionally engages the surface of the ring 198 and thereby drives the roller 20, and at the same time cleans off a band of the material with which the strip 156 is coated, before said material on the strip has been "set." In order to facilitate the cleaning, the surface of the ring 198 is traversed by a wick 205 which extends from a tubular portion 206 of a cleaning fluid reservoir 207. The inner end 208 of the wick is rolled to present a greater quantity of free capillary ends to gather and convey the cleaning fluid 209 to the surface of 198. By this means a central band of coating may be removed from the strip, and the strip may be split lengthwise to form two narrower strips. The roller 20 may also carry other rings, such as those shown at 210 and 211 and cooperating with collars on each side thereof, collars 212 and 213 bordering the ring 210 and collars 214 and 215 bordering the ring 211. With this arrangement, the strip 156 may have three longitudinal cleaned portions which divide the entire width of the strip into four narrow strips. This may be varied widely and yet remain within the scope of the invention, and obviously a greater or a smaller number of rings may be employed.

In the arrangement shown in Figure 16, I maintain the metallic strip 156 in contact with ledges 216 and 217 by magnetic means. The body 24a is made of brass, aluminum, or any other suitable non-magnetic material. Likewise the sleeve 22 carrying threads 23 is made of non-magnetic material. The spider 52 is made of magnetic material and so are the extensions 57, 58 and 59 and the annulus 63a and the ledge 217. The flange 60a is also made of magnetic material. Joining the spider 52 is a sleeve member 218 formed of magnetic material. This sleeve member is free to move within a second sleeve 219, which is also of magnetic material. Said second sleeve also has an annular flange 220 on its left end, as seen in Figure 16 and its periphery is the ledge 216 above referred to. The left end of the body 24 is enlarged and has an annular portion 221 which extends into an annular groove in the flange. A hub member 222 is secured to the shaft 21 and carries a flange 30a, and it and the flange may be formed of magnetic material. The hub 222 has a counterbore therein to accommodate the left end of the sleeve 22, and a second or outer counterbore 223 which clears bushing 37a. Carried on the sleeve 219 is an electro-magnet winding 224. One end of this winding is insulatedly lead to a collector ring 225 carried on an insulated sleeve 226, and the other end of the magnetic winding is insulatedly lead to a second collector ring 227 on said insulated sleeve. A brush 228 bears on the collector ring 225 and a brush 229 bears on collector ring 227, and when these brushes are connected to a source of direct current, with 228 connected to the negative side and 229 connected to the positive side, the ledge 216 is magnetized with a "North" polarity and with the ledge 217 having a "South" polarity. The brushes continue to supply current to the winding 224 via the collector rings until current from said source is interrupted.

In the modification shown in Figures 17 and 18, the structure of the roller per se is substantially the same as that shown in Figures 1 and 2, and the same elements in Figures 17 and 18 bear the same numeral as those shown in Figures 1 and 2.

The body 24 has a hub 230 which is counterbored to accommodate the left end of the sleeve member 22. The hub 230, the flange 30, and the ledge 27 form a one-piece structure. This structure has an annular groove 231 formed therein to accommodate the left end of the sleeve like body 24. The end of the body 24 is secured in the groove 231 in any suitable manner, for example by means of flat head screws 232. Within the body 24 is a refrigerated coil comprised of a group of convolutions 232 and a second group of convolutions 233 spaced apart from said first convolutions and joined to said first convolutions by connecting tubes, one of which is shown at 234. Joining the inlet end of the group 232 are a plurality of convolutions 235 of tubing which is very small in diameter and the interior of which approaches the proportions of a capillary tube. The inlet end of said last mentioned tube communicates with a space 237 which is divided between an outer flexible bellows 238 and an inner flexible bellows 239. Secured to the flange 30 is a disc 240 which is preferably hardened and ground and highly polished. An annular ring 241 is secured in fluid type relation to the end of the flexible fluid bellows 238, and this ring bears against the disc 240 and traverses the latter along a path which is between the inlet 236 and the outer periphery of the disc 240. A second annular ring 242 is secured in fluid tight relation to the right end of the inner flexible divided bellows 239 and this ring bears against the disc 240 and traverses a path between the inlet 236 and the inner periphery of the disc 240 thereby forming a double stuffing box. For low pressure refrigerants the resiliency of the flexible bellows is sufficient to establish running seals between the rings 241 and 242 and the disc 240, and for refrigerants employing higher pressures the force exerted by the bellows may be augmented by spring means. The other or left ends of the bellows are secured in fluid tight relation to an annular ring member 243 having a central hole 244 therethrough. The outer end of the inner bellows 239 is soldered or brazed to the inner periphery 245 of the hole 244, and the corresponding end of the bellows 238 is soldered or brazed to the outer periphery 246. A fitting 247 is threaded into the member 243 and has a passage 248 communicating with the space 237 between the bellows. This fitting is connected via a conduit 249 to the receiver 251 of a refrigerating high side unit 250. The member 243 is rigidly supported on a bracket 252 one end of which has screws engaging the member 243 and the other of which has screws, such as screws 253 secured to the base of the bearing standard 236.

The outlet of the convolutions 233 extends through the end portion 254 of the body member 24 and is connected in fluid tight relation to a disc like member 261, which is substantially identical with the disc 240. An outer flexible bellows 255 has one end connected to an annular ring 256 which bears against and traverses an annular path on the element 261, and its other end is connected in fluid tight relation with the outer periphery 257 of an annular member 258. An inner flexible bellows 259 has one end connected in fluid tight relation to a ring 260 which also bears against the disc member 261, and thereby a double running seal is effected between the rings 256 and 260 with the disc 261. The other end of the bellows 259 is connected in fluid tight relation to the inner periphery 262 of a hole 263 formed in the member 258.

The member 258 is supported and held against rotation by a bracket member 264 which is secured to the member 258 and to a fixed base support 265 by means of screws 266.

A fitting 267 threadedly engages an L-shaped passage 268–a formed in the member 258 and communicating with the space 268 disposed between the bellows 255 and 259 (with which the outlet of the convolutions 233 also communicates).

Extending from the fitting 267 is a conduit 269 which is in turn connected to the inlet of a compressor 270 in the high side unit 250. The compressor is driven by an electric motor 271, and suitable controls (not shown) may be provided for controlling the operation of the high side unit.

In operation the compressor 270 draws gaseous refrigerant from the outlet end of the convolutions 233 and this gaseous refrigerant is compressed and is handled to an air cooled condenser 272 via a conduit 273. The compressed refrigerant is cooled in the condenser and goes down into the receiver 251. From the receiver 251 liquid refrigerant via the conduit 241 is delivered into the space 237 between the bellows 238 and 239 and thence into the capillary like convolutions 235 and thence into the main convolution 232. The refrigerant boils in these convolutions and consequently takes up heat and thereby refrigerates the roller, particularly the ledges 27 and 61. The ledge 61 is kept at quite a low temperature even though it is on an adjustable portion of the roller and by refrigerating these ledges I am enabled to handle coated strips even before the coating material has hardened and set.

In the modification shown in Figure 19 the roller, designated by the numeral 24 has the following elements substantially identical with corresponding elements in Figure 1; a shaft 21 upon which a sleeve member 22 forms a working fit. The sleeve member 22 has threads 23 formed thereon and these threads are engaged by corresponding threads in the hub 53 of a spider 52. The spider has extensions 57, 58 and 59, like those shown in Figure 3, the extremities of which are secured to the annular sleeve portion 63 of the adjustable flange 60 by means of screws 63a. Abutting the flange 60 is an annular ledge 61.

Secured to the flange 60 is a bobbin 275 containing an inductive winding 276 which may be connected to a source of alternating current.

On the left end of the body 24 is a flange 30a having a boss 277 formed integral therewith. The flange 30a has a boss portion 278 which is similar to the boss portion 29 of Figure 1, and integral with the boss 278 is a smaller boss 279 which is counterbored to accommodate the left end of the sleeve member 22. The body 24 and the flange member 30a are secured together in the same manner as the corresponding elements of the form of the device shown in Figure 1. The boss 277 has mounted thereon a bobbin 280 which carries an inductive winding 281 adapted to be connected to a source of alternating current. An L-shaped bracket 282 has one leg secured to the bobbin and the other to a base 283.

The bobbin 275 has secured thereto an L-shaped bracket 284, one leg of which is secured to the bobbin 275 and the other leg of which carries a dovetail member 285 adapted to slide in a suitable groove (not shown) formed in a base supporting the device.

Flange 60 and all elements carried thereby may be adjusted axially in the same manner as the corresponding one in Figure 1 by loosening the handscrew 44 and rotating the hand wheel 38 of Figure 1 in either direction in accordance with the width of the strip to be handled.

With the device of Figure 19 connected to a source of alternating current the flange 60 and its annular flange 61 are heated by induction (hysteresis and eddy currents). The winding 281 heats the hub 277 and the boss 278 and the flanges 30a are heated by induction and in turn the ledge 27 is heated. Thus, when a roller modified in this manner is used the ledges 61 and 27 are heated upon which the side extremities of the flexible strip rest.

As a further modification of the rollers, such as those shown in Figures 1 and 2 for example the ledges 27 and 61 may be formed of other materials than metal, for example "Micarta," hard wood, either highly polished or impregnated with wax, or they may be made of detachably mounted rings formed of the materials named above or they may be formed of material having a high polish, or they may be formed of metal and plated with chromium.

In Figures 1 and 2 the ledges 27 and 61 are shown as comparatively narrow. It is understood that I am not limited by the width of these ledges, as they may be made narrower for some purposes and wider for other purposes, and the forms described above have been found to be very useful in connection with various types of coating and particularly the handling of the strip after it has been coated.

This application is a continuation of my copending application Serial No. 338,798 filed February 25, 1953, now abandoned, for "Apparatus for Transporting Coated Flexible Sheet Material."

Although I have shown and described herein one embodiment of the invention and a number of modifications thereof, I do not wish to be limited to the exact details shown and described, as many changes may be made in the arrangements shown and described, within the scope of the following claims.

What is claimed is:

1. A roller comprising a tubular body, a shaft coaxially mounted within the tubular body, a first flange on one end of the tubular body, a second flange adjustably carried on the tubular body, an adjustable member mounted within the tubular body, a sleeve mounted on the shaft, at least a portion of the sleeve being positioned within the tubular body and having means operatable in response to movement of the sleeve for adjusting the adjustable member longitudinally, means for releasably attaching the sleeve to the shaft to prevent relative movement therebetween, the adjustable member being in operatable relationship with the sleeve adjusting means, a slot in the tubular body extending longitudinally thereof, the adjustable member being connected with the second flange through the slot, the sleeve being movable on the shaft upon releasing the sleeve attaching means, the adjustable member being movable longitudinally upon movement of the sleeve to actuate the sleeve adjusting means, the adjustable member as it moves longitudinally also moving the second flange longitudinally along the tubular member thereby varying the distance between the first flange and the second flange.

2. A roller comprising a tubular body, a shaft coaxially mounted within the tubular body, the shaft being of sufficient length and positioned whereby portions extend past either end of the tubular body thereby providing end portions for rotatably mounting the roller, a fixed flange on one end of the tubular body, an annular ledge adjoining the fixed flange, means for attaching the fixed flange to the shaft to prevent relative movement therebetween, a second flange adjustably carried on the tubular body, an annular ledge adjoining the second flange, a sleeve mounted on the shaft, at least a portion of the sleeve being threaded and positioned within the tubular body, means for releasably attaching the sleeve to the shaft to prevent relative movement therebetween, an internally threaded member mounted within the tubular member and in threaded engagement with the threaded portion of the sleeve, a longitudinal slot in the tubular body, the internally threaded member being connected with the second flange through the longitudinal slot, the sleeve being rotatable on the shaft upon releasing the sleeve attaching means, the internally threaded member being movable longitudinally within the tubular member and along the threaded portion of the sleeve upon rotation of the sleeve, the internally threaded member as it moves longitudinally also moving the adjustable flange longitudinally along the tubular member thereby varying the distance between the fixed flange and the second flange.

3. The roller of claim 2 wherein refrigerating means is provided for refrigerating the annular ledges.

4. The roller of claim 2 wherein heating means is provided for heating the annular ledges.

5. The roller of claim 2 wherein the annular ledges are constructed of ferrous metal and means is provided for magnetizing the annular ledges.

6. The roller of claim 2 wherein an annulus is mounted on the tubular body between the flanges.

7. The roller of claim 2 wherein means is provided for urging strip material against the annular ledges.

8. Apparatus for transporting strip material comprising a plurality of rollers, each of the rollers comprising a shaft for rotatably supporting the roller, a roller body on the shaft, a fixed flange on one end of the roller body, and an adjustable flange on the roller body spaced from the fixed flange, a support means, an array of spaced pairs of bearings on the support means for rotatably supporting the roller shafts, the shafts of the rollers being mounted in the bearings to provide an array of rollers, and means for passing strip material along a path including the array of rollers, the fixed flanges of the array of rollers being aligned to thereby form a line of reference substantially parallel with the path of travel of the strip material, and the adjustable flanges of the array of rollers being adjustable with respect to the line of reference formed by the aligned fixed flanges thereby enabling the adjustable flanges to be readily aligned along the line substantially parallel with the path of travel of the strip material.

9. Apparatus for transporting strip material comprising a plurality of rollers, each of the rollers comprising a tubular body, a shaft coaxially mounted within the tubular body, the shaft being of sufficient length and positioned whereby portions extend past either end of the tubular body thereby providing end portions for rotatably mounting the roller, a fixed flange on one end of the tubular body, an annular ledge adjoining the fixed flange, means for attaching the fixed flange to the shaft to prevent relative movement therebetween, a second flange adjustably carried on the tubular body, an annular ledge adjoining the second flange, a sleeve mounted on the shaft, at least a portion of the sleeve being threaded and positioned within the tubular body, means for releasably attaching the sleeve to the shaft to prevent relative movement therebetween, and an internally threaded member mounted within the tubular member and in threaded engagement with the threaded portion of the sleeve, a longitudinal slot in the tubular body, the internally threaded member being connected with the second flange through the longitudinal slot, the sleeve being rotatable on the shaft upon releasing the sleeve attaching means, the internally threaded member being movable longitudinally within the tubular member and along the threaded portion of the sleeve upon rotation of the sleeve, the internally threaded member as it moves longitudinally also moving the adjustable flange longitudinally along the tubular member thereby varying the distance between the fixed flange and the second flange, a support means, a first array of spaced pairs of bearings on the support means for rotatably supporting the roller shafts, the shafts of the rollers being mounted in the bearings to provide a first array of rollers, a second array of like rollers with shafts mounted in a second array of bearings on the support means and in spaced apart relation to the first array, and means for passing strip material along a path including the first and second arrays of rollers, the fixed flanges of the first and second arrays of rollers being aligned to thereby form a line of reference substantially parallel with the path of travel of the strip material, and the adjustable flanges of the arrays of rollers being adjustable with respect to the line of reference formed by the aligned fixed flanges thereby enabling the adjustable flanges to be readily aligned along a line substantially parallel with the path of travel of the strip material.

10. The apparatus of claim 9 wherein means is provided for urging strip material against the annular ledges.

References Cited in the file of this patent

UNITED STATES PATENTS

| | | |
|---|---|---|
| 546,878 | Blackburn | Sept. 24, 1895 |
| 1,631,476 | De Moos | June 7, 1927 |
| 1,848,856 | Wagner et al. | Mar. 8, 1932 |
| 2,163,712 | Shearer | June 27, 1939 |
| 2,226,187 | Van Derhoef et al. | Dec. 24, 1940 |
| 2,248,333 | Burbank | July 8, 1941 |
| 2,335,277 | Heller | Nov. 30, 1943 |
| 2,550,511 | Williams | Apr. 24, 1951 |
| 2,632,611 | Berta | Mar. 24, 1953 |
| 2,635,872 | Birse | Apr. 21, 1953 |